M. C. BRIGHT.
STEERING GEAR ATTACHMENT.
APPLICATION FILED AUG. 7, 1916.
1,271,537.
Patented July 9, 1918.
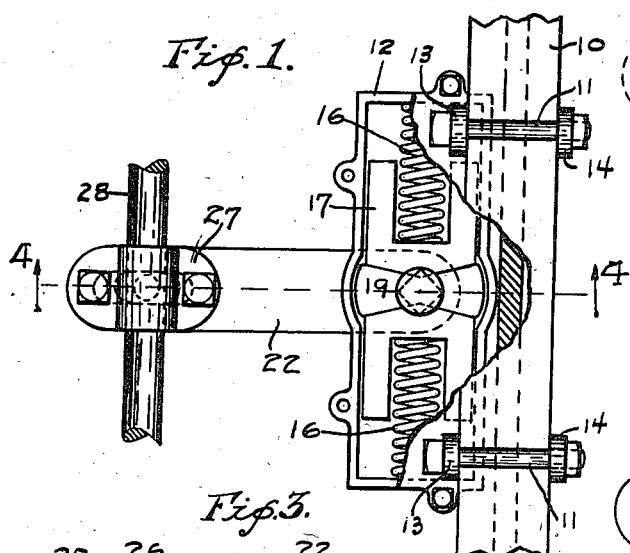
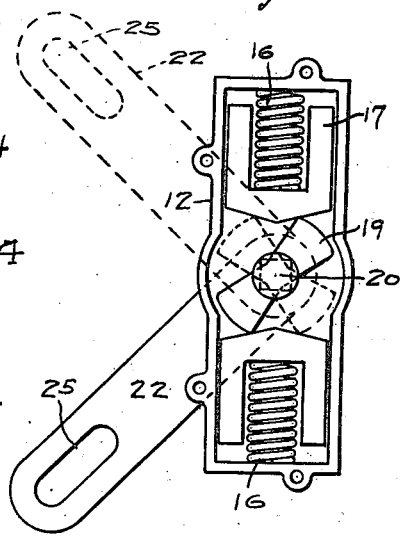
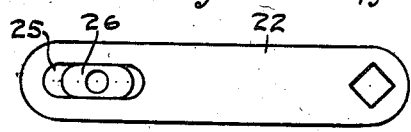
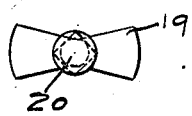
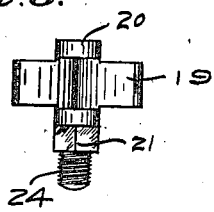
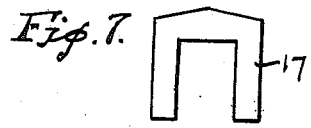
WITNESS
*JH Swan*
INVENTOR
MARTIN C. BRIGHT.
BY
Lockwood & Lockwood
ATTORNEYS

UNITED STATES PATENT OFFICE.

MARTIN C. BRIGHT, OF INDIANAPOLIS, INDIANA, ASSIGNOR OF ONE-HALF TO THOMAS BEMIS, SR., OF INDIANAPOLIS, INDIANA.

STEERING-GEAR ATTACHMENT.

1,271,537.  Specification of Letters Patent.  Patented July 9, 1918.

Application filed August 7, 1916.  Serial No. 113,523.

*To all whom it may concern:*

Be it known that I, MARTIN C. BRIGHT, a citizen of the United States, and a resident of Indianapolis, county of Marion, and State of Indiana, have invented a certain new and useful Steering-Gear Attachment; and I do hereby declare that the following is a full, clear, and exact description thereof, reference being had to the accompanying drawings, in which like letters refer to like parts.

This invention relates to means for stabilizing the steering apparatus of an automobile, which steering apparatus does not have the usual gears for holding the wheels in position, such as the steering apparatus used in many automobiles have.

With such steering apparatus as first mentioned, it is necessary for the driver to firmly hold the steering wheel in position at all times to prevent the car from leaving the road, or hold it in its course when the wheels strike some obstacle which subjects the driver to the continuous vibrations and not only makes driving dangerous, but fatiguing. This invention does away with the necessity of gripping the wheel at all times, as it provides means for automatically and instantaneously returning the wheels to their normal course preferably straight ahead.

This is accomplished by means of a pivotal bar connecting the tie rod of the steering apparatus to spring actuated means for yieldingly holding the tie rod in such a position as to give the steering wheel a straight course.

The full nature of the invention will be understood from the accompanying drawings and the following description and claims.

Figure 1 is a plan view of the device secured to the front axle and tie rod of the automobile with parts broken away. Fig. 2 is a plan view of the device in operated position with the cover removed. Fig. 3 is a plan view of the pivotal connection. Fig. 4 is a cross section on the line 4—4 of Fig. 1. Fig. 5 is a plan view of the compression arms. Fig. 6 is a side elevation of the compression arms. Fig. 7 is a plan view of the spring pressed follower. Fig. 8 is an end elevation of the spring pressed follower.

In the drawings there is shown the front axle 10 of an automobile. Bolted to said axle by the bolts 11 there is a housing 12 which is adapted to fit snugly between the upper and lower flanges of the front axle. Said housing has projections 13 extending upwardly and downwardly therefrom through which the bolts 11 are adapted to pass, clamping it to said axle by means of the clamping plates 14.

An inclosing lid or plate 15 is secured over said housing so as to inclose the mechanism contained therein and prevent dust or dirt from entering and clogging said mechanism.

Resting against or arrested by each end of said housing, there are spiral compression springs 16. Resting against the inner ends of said springs there are spring pressed followers 17 which are preferably provided with longitudinal arms extending on each side of the springs for inclosing said springs and guiding said followers in the housing. The spring pressed followers are preferably provided with tapering inner ends as shown in Fig. 7. In the center of said housing there are provided arms or levers 19 extending diametrically opposite to each other with faces preferably tapering inward toward the center to conform with the inner ends of the followers 17. Said arms have an upwardly projecting arbor 20 which is pivotally secured in said cover 15. A downwardly extending projection extends through the bottom of the housing and is preferably provided with a square surface 21 to which is rigidly secured the pivotal connecting bar 22. Said bar is held in place by a nut 23 which is adapted to screw on the threads 24. The pivotal connecting bar 22 is provided with a slot 25 at its other end in which there is a sliding member 26 pivoted to a clamp 27 which is securely bolted to the tie rod 28, connected with the steering apparatus of the automobile.

The springs 16 are set so that the tension exerted is directed toward the center of the device whereby the spring pressed followers will be forced against and engage the arms 19. The arms and the inner ends of the followers are so shaped that they register with each other when the device is in normal position as seen in Fig. 1. But when the tie rod is moved by the steering apparatus, the connecting bar 22 operates the arms so as to turn them to the position shown in Fig. 2, whereby their outer ends engage the inner and tapering ends of the followers and force them against the springs 16, whereby the springs are compressed and the device is under tension which is only relieved when the steering apparatus is permitted to return to its normal running position. It will, therefore, be readily seen that whichever way the wheels of the automobile are turned upon their release by the driver, or when emerging from a rut or otherwise deflected the device above disclosed will, through the tie rod, quickly and automatically return said wheels to normal position, this result being due to the springs acting on the followers to return said arms, and their arbor, and connecting bar to their normal positions.

The tie rod 28 when traveling from normal position shown in Fig. 1, to extreme operating position as shown in Fig. 2 and which is found to be 45 degrees will not travel on a radius from any center available between it and the axle, and should the rod be attached to the connecting bar 22 on a fixed pivot, the tie rod will be forced outward on a strain and the connecting bar 22, then being at an angle of 45 degrees it is obvious the extra strain put thereon by the tie rod will require a heavier spring to do the work. To overcome this a sliding member 26 is used in the slot hole 25 of connecting bar 22 and the sliding member 26 also saves wear on the arbor 29 of 27, it being evident that the round side of this arbor would wear quickly against the walls of slot 25 and cause looseness in slot 25 and consequently the connecting bar 22 will not be held normal in a firm position.

The invention is not limited to the particular details of construction as here shown as it can be modified in many particulars without departing from the spirit of this invention.

For instance, the inner face of the follower 17 could be straight across or any irregular shape, however, it is preferred to taper outwardly toward the center as shown, because when the connecting bar 22 is operated to its fullest extent as shown in Fig. 2 it is obvious that the tapered end of 17 is found to be pressing on an incline outwardly against the end of 19 causing it to more easily assume its normal position, with least possible friction, and furthermore, at no time can end of 19 become locked on end of 17 as might occur if its face was straight or of some irregular shape.

Instead of the compression member 19 being formed of two arms, one only could be used by having the two followers. Instead of the two followers one only could be used in connection with the two arms. Instead of having the arbor in the center of 19 a single arm can be pivoted lever shaped and act on the two followers; or two arms with the arbor beyond them and so shaped as to work on either one of the two followers; or operate directly against the spring 16. All the foregoing will accomplish the same results; however, it is preferable to use two arms and the two followers because the operation is more evenly balanced and when connecting bar 22 is in its normal position, the firmness with which the arms are held by the followers causes the connecting bar to be held more firmly.

The closed housing 22 is preferable to an open frame for holding the various parts because it keeps out dust and can be filled with heavy grease; however in the claims where the word housing is used it is to be understood that any arrangement apparent to one skilled in the art for holding the parts is considered to be the equivalent to the housing.

The invention claimed is:

1. A steering device for automobiles including a housing adapted to be secured to the front axle, a compression spring mounted in said housing with one end arrested by the housing, a follower slidable in the housing and in position to arrest the other end of said spring, said follower having one face tapering outwardly toward the center, an arm pivoted in the housing in position for its outer end to engage said follower and means attached to said arm and to the tie rod of the automobile for actuating said arm and moving the follower to compress said spring when the tie rod is moved and arranged so that said spring will return said follower, arm and tie rod actuated means to normal position.

2. A steering device for automobiles including a housing adapted to be secured to the front axle, a compression spring mounted therein with one end arrested by the housing, a connecting bar pivoted at one end to the tie rod of the automobile and at the other end to said housing, an arm in said housing rigidly connected to said connecting bar and a follower slidable in said housing and in engagement with the other end of said spring, said follower having a face tapering outwardly toward its center for engagement with the end of said arm.

3. A steering device for automobiles including a housing adapted to be secured to the front axle, compression springs with one end arrested by the housing and the other end extending inwardly, spring pressed followers adapted to engage the inner ends of said springs having ends tapering outward toward the center thereof, oppositely extending arms pivoted in said housing between said followers having faces extending inwardly toward the center against which said followers are forced to seat by the normal tension of said springs, and a connecting bar secured to said arms and slidingly pivoted to the tie rod of the automobile, whereby said tie rod will be returned to its normal position after being operated.

4. A steering device for automobiles including a housing adapted to be secured to the front axle, a removable cover on said housing, spiral compression springs each with one end arrested by the housing and the other end extending inwardly, spring pressed followers having their ends tapering and adapted to engage the inner ends of said springs, oppositely extending arms pivoted to said housing between said followers and tapering toward each other so as to bring the outer ends of the arms into immediate action against said followers, whereby the movement of said arms will force said followers against said springs, a pivotal connecting bar secured to said arms, and a sliding member pivoted to the tie rod of the automobile and adapted to slide in a slot in said bar whereby, said tie rod will be returned to its normal position after being operated.

5. A steering device for automobiles including a housing adapted to be secured to the front axle, a pair of oppositely disposed slidable followers in said housing with their adjacent ends provided each with an inclined surface and said surfaces on the two followers being inclined reversely to each other, compression springs acting against the followers tending to force them toward each other, a bar pivotally connected at one end with the tie rod of the automobile and at the other end to an arm in said housing located between the two followers and having it sides inclined so as to bring the outer ends of the arms into immediate action against the inclined surfaces of the two followers when the automobile is in straight-ahead or any other position.

6. A steering device for automobiles including a housing adapted to be secured to the front axle, a follower slidable in said housing and having one end thereof tapering so as to have a pair of inclined surfaces, a connecting bar pivotally connected at one end with the tie rod of the automobile and at the other end with said housing, a pair of oppositely extending arms rigidly connected with said connecting bar and mounted in said housing and having an inclined surface arranged so its outer end will engage the inclined surfaces of the follower when the automobile is in its straight-ahead or any other position.

In witness whereof, I have hereunto affixed my signature.

MARTIN C. BRIGHT.